United States Patent [19]

Koglin

[11] 4,261,836

[45] Apr. 14, 1981

[54] METHOD OF AND A DEVICE FOR A CONTINUOUS CONDITIONING OF SLUDGES

[75] Inventor: Bodo Koglin, Berlin, Fed. Rep. of Germany

[73] Assignee: Vereinigte Kesselwerke Aktiengesellschaft, Düsseldorf, Fed. Rep. of Germany

[21] Appl. No.: 48,433

[22] Filed: Jun. 14, 1979

[30] Foreign Application Priority Data

Jun. 15, 1978 [DE] Fed. Rep. of Germany ....... 2826132

[51] Int. Cl.³ ............................................. C02F 11/18
[52] U.S. Cl. .................................... 210/737; 210/739; 210/96.1; 210/180; 210/149
[58] Field of Search ...................... 210/63 R, 71, 96.1, 210/177, 10, 56, 72, 149, 180, 187, 255

[56] References Cited

U.S. PATENT DOCUMENTS

| | | | |
|---|---|---|---|
| 3,219,579 | 11/1965 | Kranz | 210/177 X |
| 3,464,917 | 9/1969 | Porteous | 210/71 X |
| 3,661,778 | 5/1972 | Prodt | 210/63 R |
| 3,804,755 | 4/1974 | Cervantes | 210/56 X |
| 3,986,955 | 10/1976 | Plicque | 210/180 X |
| 4,013,560 | 3/1977 | Prodt | 210/63 R |
| 4,100,730 | 7/1978 | Prodt | 210/63 R |

Primary Examiner—Thomas G. Wyse
Attorney, Agent, or Firm—Michael J. Striker

[57] ABSTRACT

The method of and a device for conditioning sludges, especially sewage sludges at an increased pressure and at an increased temperature wherein the raw sludge is fed by means of high-pressure pumps through a plurality of heat exchanging stations until it is brought in the last station to a pressure which is sufficient for the conditioning. Thereupon the conditioned sludge is returned through the same stations and in each station is pressure released and cooled. Steam released due to the cooling is brought in contact with the incoming raw sludge and warms up the same to a saturation temperature. To insure optimum heat exchange, each station is provided with means for measuring the concentration of gas components admixed to the steam and the discharge of the gaseous mixture from the station is controlled in response to the measured concentration value.

5 Claims, 2 Drawing Figures

METHOD OF AND A DEVICE FOR A CONTINUOUS CONDITIONING OF SLUDGES

BACKGROUND OF THE INVENTION

This invention relates generally to a method of and a device for continuous conditioning of sludges, particularly of sewage sludges, and more specifically it relates to a method in which the raw sludge is treated at an increased pressure and at an increased temperature while passing through successively arranged treatment stations until it is subject to a pressure required for the conditioning and subsequently the conditioned sludge is returned through the respective stations and is successively subject to decreasing pressure; at the same time the raw sludge, when passing through the consecutive stations, is heated up by vapors released during the depressurization of the conditioned sludge in respective stations and is thus preheated to a saturation temperature.

In thermal sludge conditioning it is more advantageous for regeneration of heat to use a direct heat exchange instead of an indirect heat exchange, because the direct heat exchange requires simpler equipment in the conditioning installation which is less susceptible to failure and also requires less maintenance. On the other hand, a sludge conditioner based on direct heat exchange is more expensive with regard to the measuring and controlling devices.

A method of the aforedescribed type is described in the German Pat. No. 20 19 731. In this prior-art method the pressure in respective stations is adjusted by means of exhaust gas releasing valves whereby it is necessary first to compute from a predetermined conditioning pressure in the reaction station the optimum pressures in respective heat exchanging stations and the gas releasing valves are adjusted according to the computed results so that when a computed pressure is exceeded a corresponding amount of exhaust gas is released.

This known control is possessed, however, of several disadvantages. If, for example, it is desired to change the pressure in the reactor for any reason, then it is necessary to change the pressures in all the remaining heat exchanging stations. In addition, this method does not make it possible to compensate for pressure deviations during which pressure in a station is below the computed optimum level. To correct such deviations, additional measures are necessary such as, for example, the intake of extraneous steam into the station in question. These equipment for effecting such measures represent additional investment expenditures and increased operational costs. Furthermore, the discharge of gas from the intermediate stations naturally causes heat losses and it is, therefore, desirable that such gas releases be limited to a minimum. The discharge of a certain amount of gas, however, is necessary because the atmosphere in individual stations which under ideal conditions should consist of pure steam only, is in effect formed of a gaseous mixture containing steam enriched with a smaller or larger amount of gaseous components, primarily carbon dioxide, which impairs the heat exchange.

SUMMARY OF THE INVENTION

It is, therefore, a general object of the present invention to overcome the aforementioned disadvantages.

More particularly, it is an object of the invention to provide an improved sludge conditioning method and device in which the aforementioned control of the exhaust gas is simplified.

Another object of the invention is to provide such an improved method and device in which the heat losses are kept at a minimum.

In keeping with these objects, and others which will become apparent hereafter, one feature of the invention resides in the provision of a sludge conditioning method and apparatus in which concentration of the gas component which impairs the heat exchange in each station preceding the terminal reactor is continuously measured and the measured value of this concentration is employed for controlling the amount of exhaust gas released from these stations. The measurement of the concentration of the inert gas component that is of the gas component which impairs the heat exchange, can be made at the outlet of the exhaust gas where this concentration attains its highest value.

It has been found also that the generation of the heat exchange impairing gas component is different in respective stations. First of all, it is the coolest and the hottest station where a considerable amount of the heat exchange impairing gas component is generated. In contrast, in the intermediate station there occurs only a negligible amount of the heat transfer inhibiting gas component. Accordingly, it is possible in the methods and in the device of this invention to avoid almost completely any steam losses in these intermediate stations.

It has been found that in each heat exchanging station the difference between the temperature of the raw sludge at the outlet from the station and the temperature of the conditioned sludge introduced into the station is a measure for the concentration of the aforementioned heat exchange impairing gas component. This finding is consistent with the fact that the aforementioned temperature difference results from the incompleteness of the heat exchange which above all is caused by the contents of the heat exchange inhibiting gas component.

Accordingly, in a preferred embodiment of this invention each station is equipped with means for determining the difference between the outlet temperature of the raw sludge and the outlet temperature of the conditioned sludge and with means for controlling the discharge of the exhaust gas from the station in response to the measured temperature difference. This preferred embodiment of the invention is particularly simple in construction and operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
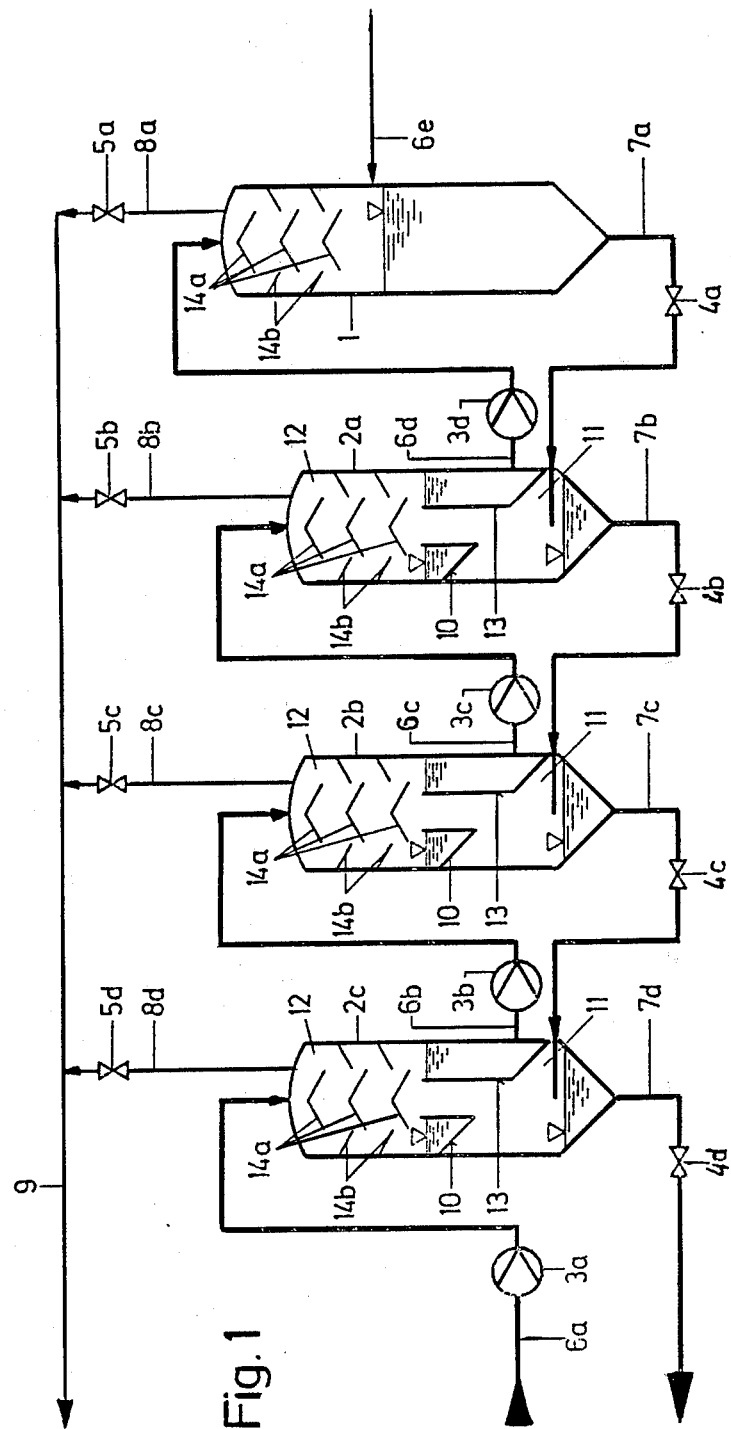
FIG. 1 is a schematic diagram of a sludge conditioning installation employing the method of this invention.
Figure 2:
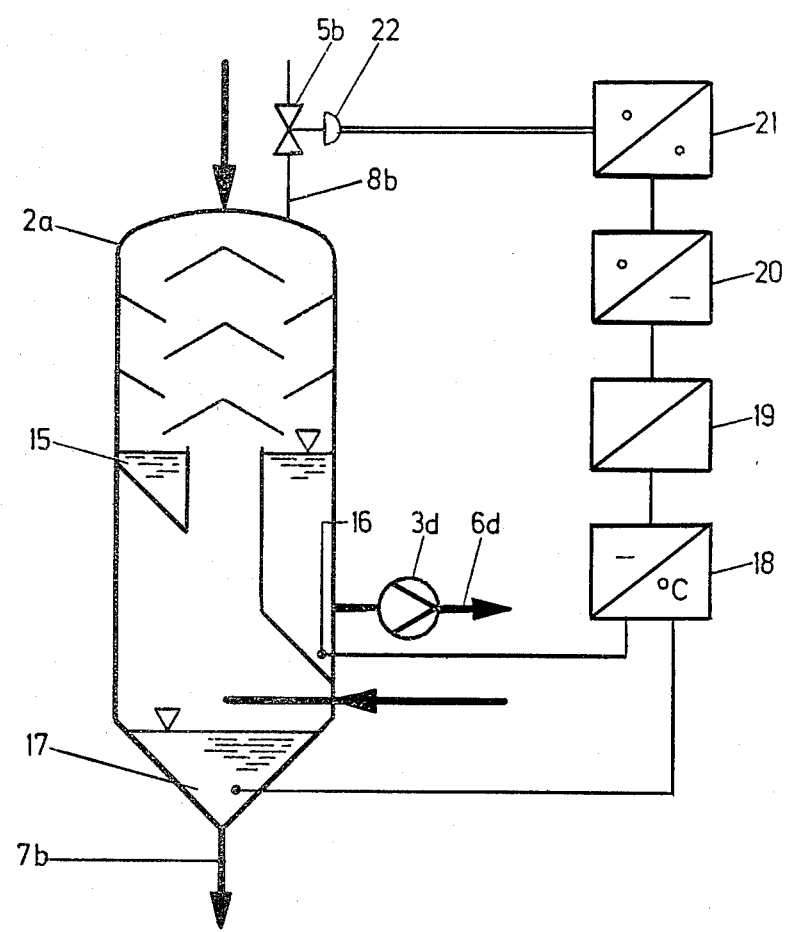
FIG. 2 is a preliminary heat exchanging station, including measuring and controlling devices according to this invention.

Referring firstly to FIG. 1, the illustrated sludge conditioning installation includes a reactor 1 interconnected with three successively arranged direct heat exchangers 2a, 2b and 2c. In practice, there is of course a larger number of these direct heat exchangers, approximately up to six to achieve the optimum result. Each direct heat exchanger is constituted of an upright cylindrical container having a convex bottom, an intermediate annular compartment having an inclined bottom 10 which divides the interior of the container into a lower space 11 and an upper space 12. The spaces 11 and 12 communicate with one another through the central opening of the annular bottom 10. An upwardly directed tubular partition 13 is welded to the rim of the central opening of the bottom 10 and defines with the cylindrical wall of the container an annular compartment or chute 15 (FIG. 2). In the upper space 12 there is provided a cascade of superposed distributing metal sheets 14a and 14b.

The raw sludge is fed from a non-illustrated reservoir via a pipe conduit 6a to a high-pressure pump 3a and therefrom to an intake port in the center of the top wall of the heat exchanger 2c. Corresponding pipe conduits 6b and 6c and high-pressure pumps 3b and 3c connect the lowermost part of the chute or partition 15 in respective direct heat exchangers 2c and 2b to the intake ports on the top of subsequent heat exchangers 2b and 2a. Finally, a pipe conduit 6d including a high-pressure pump 3d connects the chute 15 of the direct heat exchanger 2e to the top intake port of the reactor vessel 1.

The upper space in the reactor vessel 1 is also provided with a cascade of sludge distributing metal sheets 14a and 14b and below the cascade is an inlet connection for a conduit 6e through which an extraneous steam is introduced into the reactor.

A conduit 7a connects the convex bottom of the reactor vessel 1 via a pressure release valve 4a to a connection in the cylindrical wall of the heat exchanger 2a opening into the lower space 11 of the latter. Corresponding conduits 7b and 7c including respectively pressure release valves 4b and 4c connect the bottom of the heat exchanger 2e to the lower space 11 in the exchanger 2b and the bottom of the latter exchanger to the lower space of the next heat exchanger 2c, the bottom of which is connected via conduit 7d and pressure release valve 4d to a non-illustrated storage space for the conditioned sludge.

The upper space in the reactor 1 and the upper spaces in all heat exchangers 2a–2c are connected via conduits 8a–8d respectively provided wth valves 5a–5d, to a common or collecting conduit 9 through which the gaseous mixture in the reacting and heat exchanging stations can be discharged into the outer atmosphere.

The operation of the sludge conditioning installation according to FIG. 1 is as follows:

The raw sludge fed through conduit 6a is delivered by the pump 3a into the upper space 12 of the direct heat exchanger 2c and flows downwardly past and in contact with the cascade of the guiding metal sheets 14a and 14b where it is spread and warmed up by condensation heat of vapors rising from the lower space 11 as will be explained in more detail below. The pure heated raw sludge together with the vapor condensate falls into the intermediate annular compartment or chute 15 where it forms a swampy pool and is discharged therefrom by means of the subsequent pump 3b and the conduit 6b into the following direct heat exchanger 2b where again an increased pressure is built up. This process is repeated and the pressure is progressively increased in each of the successive heat exchanging stations 2b and 2a. Finally the preheated raw sludge is delivered by the last pump 3d into the reactor 1 where the pressure acting on the preheated sludge further increases up to the level of the reaction pressure. In the upper space of the reactor 1, the sludge descends in thin layers past the cascade or guiding metal sheets and in doing so is heated to a reaction temperature by the direct heat exchange with the counter stream of exhaust gas and by the external steam from the conduit 6e. Upon the necessary dwell of the raw sludge in the upper space of the reactor the sludge becomes conditioned, flows to the bottom of the reactor and is returned therefrom via the discharge conduit 7a and the pressure relieving valve 4a into the direct heat exchanger 2a whereby it is brought under the lower pressure taking place in the latter heat exchanger. Due to this pressure release, the conditioned sludge cools under the formation of steam or vapors. In the lower space of each direct heat exchanger, the cooler conditioned sludge is separated from its steam. The steam and other vapors and gas components rise into the upper space 12 and as explained above, they interact with the incoming raw sludge of a lower temperature. The cooled down conditioned sludge forms in the convex bottom of the heat exchanger a swampy pool and is discharged through conduit 7b and pressure relieving valve 4b into the lower space 11 of the subsequent heat exchanger 2b where the conditioned sludge is again subject to a lower pressure and cooling. In the direct heat exchangers 2b and 2c the above-described heat exchanging process takes place again and the substantially cool, conditioned sludge is discharged through the discharge conduits 7d from the installation. So far the above-described operation corresponds substantially to the known state of the art.

Referring now to the exemplary embodiment of FIG. 2, each direct heat exchanger 2a–2c is provided in the range of the intermediate annular chute or compartment 15 with a thermal element 16 which measures the temperature of the upper sludge pool and in the range of the convex bottom 17 there is provided another thermal element 17 which measures the temperature of the lower sludge pool. Respective thermal elements 16 and 17 continuously measure the temperature of the raw sludge flowing towards the reactor 1 and at the same time the temperature of the conditioned sludge flowing from the reactor 1. Both thermal elements are connected counter each other in a measuring circuit 18 where an output signal corresponding to the difference between the signals from thermal elements 16 and 17 is applied to a comparator circuit 19 where it is compared with a preset reference or nominal value. If the differential output signal from the circuit 18 differs from the preset nominal value in the comparator 19, the latter generates an output signal proportional to the deviation and this output signal is applied to the input of an electropneumatic signal converter 20 which generates at its output a pneumatic signal corresponding to the deviation and this pneumatic signal is applied to the input of a pneumatic position adjuster 21 which is coupled via pneumatic control drive 22 to the valve 5b in the discharge or exhaust gas conduit 8b and controls the flow through the valve 5b in accordance with the magnitude of the output signal from the comparator 19.

The pressure in the reactor vessel 1 is controlled by means of the extraneous steam admitted into the upper space of the reactor via the conduit 6e. As it has been explained before, there is always present a component of a gas, such as a carbon dioxide, which impairs the heat exchange. Due to this heat exchange inhibiting gas component the temperature of the sludge in the reactor 1 is several degrees centigrade below the saturation temperature. The sludge temperature is, therefore, controlled in such a manner that a certain amount of the present gaseous mixture is discharged through the valve 5a. The controlling arrangement described in connection with FIG. 2 always releases from respective direct heat exchangers 2a-2c such an amount of the gaseous mixture that the temperature difference between the upper and lower sludge pool is kept in a range which does not exceed a predetermined maximum value. In the case of a complete absence of the heat-exchange-impairing gas component, a complete heat exchange would take place and the temperature difference would be negligibly small. The control of the discharge of the exhaust gaseous mixture is controlled by maintaining the concentration of the heat transfer impairing gas component in each heat exchanger at such a low value that the deterioration of the heat transfer cannot exceed a preset level. The heat exchange controlling device of this invention thus enables the pressures and temperatures in the respective direct heat exchangers 2a-2c to be automatically adjusted to optimum intermediate values which permit incremental increase of pressure and temperature of the incoming raw sludge and an incremental decrease in the pressure and temperature of the returned, conditioned sludge.

The aforedescribed automatic control can of course be replaced by a manual control. In this case, the temperature measured by non-illustrated temperature measuring instruments has to be read periodically and according to the ascertained temperature difference the valves 5b-5d are controlled by hand.

As has been mentioned above, the temperature difference is only one measure or indication of the occurrence of the heat exchange impairing gas component in respective heat exchangers. Due to the fact that this gas component is actually the only cause of the deterioration of the heat exchange, in another embodiment of this invention the measured value of this inert gas concentration is directly used as a controlling magnitude. This gas concentration in individual direct heat exchangers is not constant but increases in the direction from the lower space to the upper space. Accordingly, the highest concentration of the inert gas component is in the exhaust gas in the uppermost space and in this area it is also measured. The direct measurement of this gas component can be made by any suitable method such as described, for example, in the German Pat. No. 22 25 853. At the same time, moisture (steam) content is measured in the main stream of the exhaust gas mixture or in individual partial streams branching from individual direct heat exchangers whereby the residual is the heat exchange impairing gas component. The control itself of the discharge of the exhaust gas from respective stations is effected similarly as in the preceding example described in connection with FIG. 2, only with the difference that instead of the temperature difference the value of concentration of the gas component is employed as the controlling magnitude.

It will be understood that each of the elements described above, or two or more together may also find a useful application in other types of constructions differing from the types described above.

While the invention has been illustrated and described as embodied in a device for conditioning sludges, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of a continuous conditioning of sludges, particularly of sewage sludges, comprising the steps of feeding the raw sludge through a succession of treatment stages while successively increasing compression and temperature of the sludge in each stage until a conditioning compression and temperature is reached in the last stage; thereafter feeding the conditioned sludge in reversed order through said succession of stages while successively reducing the compression and the temperature of the conditioned sludge and utilizing the saturation temperature of steam released during the cooling of the conditioned sludge for directly heating the incoming raw sludge; measuring the concentration of gas components admixed to the steam; and controlling the discharge of the gaseous mixture from respective stages as a function of the measured concentration of said gas components in said stages.

2. The method as defined in claim 1, wherein the measurement of said concentration of the gas component takes place at the point of discharge of the gaseous mixture from each stage.

3. The method as defined in claim 1, wherein said measuring of the concentration of said gas component includes the measurement of the temperature between the discharged raw sludge and the temperature of the discharged conditioned sludge and the difference of these temperatures is employed as a control magnitude for regulating the discharge of the gaseous mixture from each stage.

4. A device for continuous conditioning of sludges, particularly sewage sludges, comprising a succession of heat exchanging containers and a reaction container, each of said heat exchanging containers having an intermediate annular compartment separating the interior of the heat exchanging container into an upper space and a lower space; feeding means including feeding pumps connected for delivering raw sludge from the intermediate compartment in one heat exchanging container to the upper space in the subsequent heat exchanging container and to the final reaction container, thus successively increasing the pressure in respective containers; conduit means including pressure reducing valves connecting the lower space of the reaction container to the successive bottom spaces of respective heat exchanging containers, whereby a direct heat exchange takes place between steam emanating from the conditioned sludge and the incoming raw sludge; discharge means including control valves connected to said upper space of respective heat exchanging containers to discharge the gaseous mixture therefrom; means for measuring the concentration of gas components admixed to said steam in respective heat exchanging containers; and means for controlling the discharge of the gaseous mixture from respective heat exchanging containers as a function of the measured concentration of said gas components.

5. The device as defined in claim 4, wherein said means for measuring the concentration in respective heat exchanging containers includes a first thermal element arranged for measuring the discharge temperature of the incoming raw sludge and a second thermal element arranged for measuring the discharge temperature of the conditioned sludge, and control means for controlling said control valve in response to the measured temperature difference.

* * * * *